United States Patent [19]

Taggart

[11] Patent Number: 4,971,857
[45] Date of Patent: Nov. 20, 1990

[54] LAMINATED PANEL

[75] Inventor: Andrew L. C. Taggart, Olton, England

[73] Assignee: Wilsdon & Company Limited, Solihull, England

[21] Appl. No.: 481,158

[22] Filed: Feb. 20, 1990

[30] Foreign Application Priority Data

Feb. 22, 1989 [GB] United Kingdom ............... 8903957

[51] Int. Cl.[5] ............................................. B32B 3/26
[52] U.S. Cl. .............................. 428/304.4; 428/309.9; 428/318.4
[58] Field of Search ................ 428/304.4, 309.9, 318.4

[56] References Cited

FOREIGN PATENT DOCUMENTS 1266324  3/1972  United Kingdom ............. 428/319.3

Primary Examiner—William J. Van Balen
Attorney, Agent, or Firm—Scrivener and Clarke

[57] ABSTRACT

A laminated panel for use in the construction of vehicles bodies or buildings comprises a pair of substantially rigid outer layers (1,2), separated by a core (3) of foamed plastics material. The core includes a plurality of spaced elongate inserts (4) of hard plastics material such as ABS. The inserts act as anchor points for attachment of lashing rails or the like externally of one of said outer layers (1,2).

9 Claims, 1 Drawing Sheet

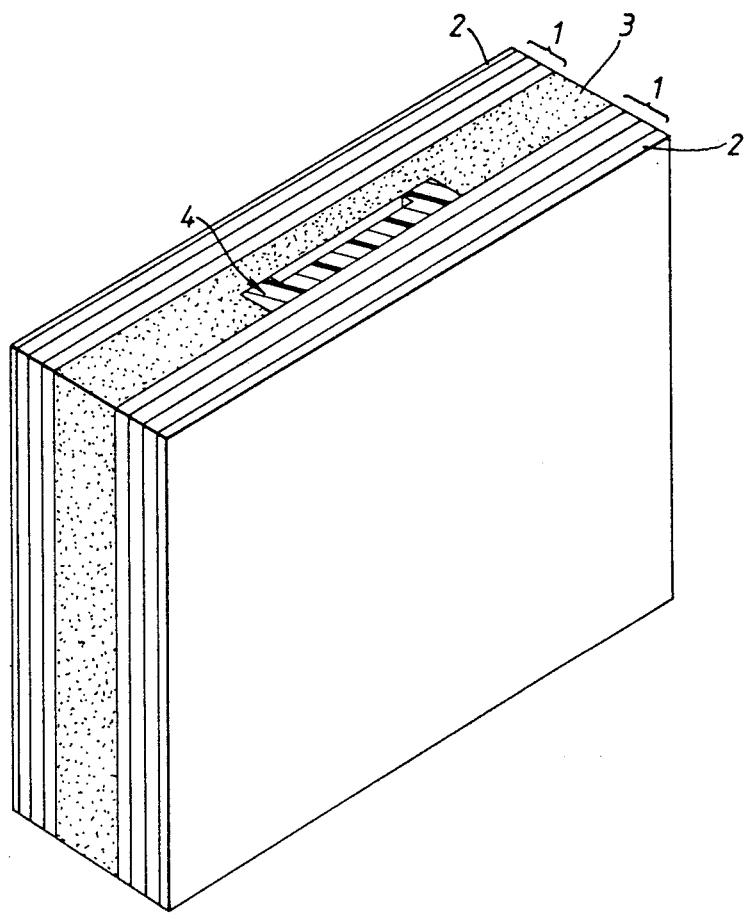

LAMINATED PANEL

The present invention relates to laminated panels. More particularly, but not exclusively, it relates to panels suitable for use in building vehicle bodies, containers or buildings, especially pre-fabricated buildings.

Laminated panels are well known. One type widely used comprises one or more layers of plywood bounded on both external surfaces by glass fibre reinforced plastic (GRP). This gives a substantially rigid structure, and, while the GRP remains in place, it is substantially waterproof. One problem which has been encountered with such laminated materials is the need to fix to them a lashing rail or other device to aid in retention of any load carried within the vehicle constructed of the panels. These are attached by means of screws or rivets to the laminate, but ideally, the screws or rivets should not penetrate to the exterior surface of the laminate since that may firstly spoil the appearance of the constructed vehicle body, and second impair its water resistance. Furthermore, the plywood itself, unless it is very thick, is generally not strong enough to hold the lashing rail in place against the loads imparted to it.

In an attempt to overcome this problem, one solution has been to make channels in at least one surface of one of the plywood layers, and insert into these channels steel bars. These steel bars then act as securing points for the lashing rail to be attached. However, steel is a comparatively heavy material and therefore may have a disadvantageous effect on the load carrying ability of the vehicle. Furthermore, the process of making the channels and inserting the steel bars into them is time consuming and therefore expensive.

It is an object of the present invention to provide a laminated panel which overcomes the above disadvantages.

According to the present invention there is provided a laminated panel for use in the construction of vehicle bodies or buildings, comprising a pair of substantially rigid outer layers, separated by a core of foamed plastics material, said core including a plurality of spaced elongate inserts of hard plastic materials, said inserts being capable of acting as anchor points for attachment of lashing rails or the like externally of one of said outer layers.

Preferably the inserts are of ABS, advantageously of thickness between 2 mm and 4 mm, ideally 3 mm.

The core may be of foamed polystyrene or polyurethane or other suitable plastics material, advantageously 6 mm in thickness.

The outer layers may be of GRP covered ply, each layer advantageously having a total thickness of 5 mm.

The inserts may be spaced at centres of 21 inches (53.3 cm).

BRIEF DESCRIPTION OF THE DRAWING

An ambodiment of the present invention will now be more particularly described by way of example and with reference to the accompanying drawing, the single FIGURE of which shows a cross-section of a small portion of a panel embodying the invention.

The panel comprises two sheets of plywood 1, each 4 mm thick. To the outside face of each is bonded a layer 2 of GRP which is approximately 1 mm thick. Separating the two layers of plywood 1 is a core of foamed polystyrene 3, which in the embodiment shown is approximately 6 mm thick. This panel would be useful for dry freight vehicles, although if an insulated vehicle is required, the core may be made thicker.

Within the polystyrene core 3 are located a plurality of elongate inserts 4, made of ABS (acrylonitrile-butadiene-styrene copolymer). These are approximately 3 mm thick and are spaced at centres of approximately 50 cm. As shown in the drawing, the inserts 4 of ABS are located within the core adjacent one of the plywood layers. The ABS insert may be rectangular in cross-section or may have a cutout on the side remote from the plywood layer to which it is adjacent.

The density of ABS is between 1.02–1.05 g/cm$^3$, whereas that of steel is 7.84 g/cm$^3$ and that of aluminium is 2.72 g/cm$^3$. Thus, for inserts of approximately the same size, the ratio of weights for ABS inserts as compared to steel inserts is approximately 1:7.5.

ABS is a tough plastics material with a good impact strength. It is also able to accept self-tapping screws or star-rivets without tearing. Thus the lashing rail may be attached on the interior face of the vehicle body by self-tapping screws which locate in an ABS insert.

The laminated panels are preferably made up to a size of 8 ft (244 cm) whatever length may be required, with the ABS inserts arranged to be vertical in use.

Comparative examples showing the present invention are given below:

COMPARATIVE WEIGHTS (kg/m$^2$)

| THICKNESS (mm) | WEIGHT OF COMPOSITE PANEL | WEIGHT OF PLYWOOD PANEL | RATIO OF WEIGHTS |
| --- | --- | --- | --- |
| 16 | 9.4 | 12.0 | 0.78 |
| 20 | 12.0 | 15.0 | 0.80 |
| 24 | 15.0 | 18.6 | 0.81 |

BENDING TEST

A 16.0 mm HC5 panel has a resistance to bending approaching that of a 14.5 mm plywood/GRP panel and a 20 mm HC5 panel has a resistance to bending approaching that of a 17.5 mm plywood/GRP panel.

LOAD DEFLECTION TEST

The preceding test was repeated on panels of equal weight, one HC5-20, one HC5-16, one 14.5 plywood and one 17.5 plywood, (wherein HC5 illustrates an embodiment of the invention, with the suffix denoting its thickness).

The strength to weight ratios for HC5 materials are approximately equal to the GRP/plywood materials they are designed to replace, hence strength to weight ratio can be said to be 1:1.

IMPACT RESISTANCE TEST

A 10kg weight was dropped from a height of 1600 mm on to a HC5-16 panel. The panel was supported at the short edges only. After the test no visible defects were apparent only slight dust impregnation from the test weight.

A similar test carried out on a 14.5 GRP/plywood panel resulted in small hairline cracks around the outline of the test weight.

ATTACHMENT STRENGTH TEST

In order to assess the effectiveness of attachment made into the ABS inserts, tests were carried out. A proprietary form of tracking was attached to the test panels using self-tapping screws and a test rig attached.

In order to eliminate panel distortion under the high test loads, the test panel was securely clamped along its free edges.

A torque of 20N.M. was recorded before any failure occurred and this was limited to the screw pulling through the panel. No further panel damage occurred and tracking could be re-fixed at a new position.

A similar test was carried out using a GRP/plywood panel. The torque at failure was also 20N.M. but severe damage occurred due to the metal plate pulling through the GRP surface causing cracks and delamination failure. Tracking could not be re-fixed due to such extensive failure.

I claim:

1. A laminated panel for use in the construction of vehicle bodies or buildings, comprising a pair of substantially rigid outer layers, separated by a core of foamed plastics material, said core including a plurality of spaced elongate inserts of hard plastics material, said inserts being capable of acting as anchor points for attachment of lashing rail means externally of one of said outer layers.

2. A laminated panel as claimed in claim 1, wherein the inserts are ABS (acrylonitrile-butadiene-styrene copolymer).

3. A laminated panel as claimed in claim 2, wherein the inserts are thickness between 2 mm and 4 mm.

4. A laminated panel as claimed in claim 3, wherein the inserts are 3 mm thick.

5. A laminated panel as claimed in claim 1, wherein the core is of foamed polystyrene.

6. A laminated panel as claimed in claim 1, wherein the core is of foamed polyurethane.

7. A laminated panel as claimed in claim 1, wherein the core is 6 mm in thickness.

8. A laminated panel as claimed in claim 1, wherein the outer layers are of GRP covered ply, each layer having a total thickness of 5 mm.

9. A laminated panel as claimed in claim 1, wherein the inserts are spaced at centres of 43 cm.

* * * * *